(12) United States Patent
Nakajima

(10) Patent No.: US 10,894,298 B2
(45) Date of Patent: Jan. 19, 2021

(54) ELECTRODE TIP REMOVAL DEVICE AND HAMMER

(71) Applicant: Kyokutoh Co., Ltd., Aichi (JP)

(72) Inventor: Kotaro Nakajima, Aichi (JP)

(73) Assignee: Kyokutoh Co., Ltd., Aichi (JP)

( * ) Notice: Subject to any disclaimer, the term of this patent is extended or adjusted under 35 U.S.C. 154(b) by 262 days.

(21) Appl. No.: 16/047,495

(22) Filed: Jul. 27, 2018

(65) Prior Publication Data

US 2018/0369949 A1   Dec. 27, 2018

Related U.S. Application Data

(63) Continuation of application No. PCT/JP2016/000416, filed on Jan. 27, 2016.

(51) Int. Cl.
*B23K 9/32* (2006.01)
*B23K 11/30* (2006.01)
(Continued)

(52) U.S. Cl.
CPC .......... *B23K 11/3072* (2013.01); *B23K 11/36* (2013.01); *B23K 31/02* (2013.01); *B25D 1/02* (2013.01); *B25B 27/00* (2013.01)

(58) Field of Classification Search
CPC .......... B25D 1/02; B23K 31/02; B23K 11/11; B23K 11/115; B23K 11/3018;
(Continued)

(56) References Cited

U.S. PATENT DOCUMENTS 2,245,838 A * 6/1941 Hall ................... B23K 11/3072
254/22
2,328,433 A * 8/1943 Dyer ................... B23K 11/3072
29/239

(Continued)

FOREIGN PATENT DOCUMENTS

CN      204195663 U    3/2015
JP     2001347380 A   12/2001
(Continued)

OTHER PUBLICATIONS

International Search Report dated Apr. 19, 2016 for PCT application No. PCT/JP2016/000416.

(Continued)

*Primary Examiner* — Hung D Nguyen
(74) *Attorney, Agent, or Firm* — Ohlandt, Greeley, Ruggiero & Perle, L.L.P.

(57) ABSTRACT

In the present disclosure, a pair of removing members (5) are provided to be able to move toward and away from each other. Each of the removing members (5) includes a nail (5A, 5B) capable of being inserted into a gap (S1) between a large diameter portion (11a) and an electrode tip (12), and a protrusion (54) extending in a direction intersecting with a direction of insertion of the nail (5A, 5B) into the gap. The protrusions (54) of one and the other one of the removing members (5) are axially supported respectively by first and second support portions (81a, 81b) provided on one end of an arm member (8). The first support portion (81a) is in the shape of a groove that is shaped to be gradually closer to the other one of the removing members as progressing toward the other end of the arm member (8).

8 Claims, 8 Drawing Sheets

(51) Int. Cl.
*B23K 11/36* (2006.01)
*B23K 31/02* (2006.01)
*B25D 1/02* (2006.01)
*B25B 27/00* (2006.01)

(58) Field of Classification Search
CPC . B23K 11/3063; B23K 11/3072; B23K 11/36; B25B 27/00
USPC ......... 219/90, 97, 98, 101, 119, 86.1, 86.25, 219/86.8
See application file for complete search history.

(56) References Cited

U.S. PATENT DOCUMENTS

| | | | | |
|---|---|---|---|---|
| 3,820,437 | A * | 6/1974 | Dyer | B23K 11/3063 408/139 |
| 5,495,663 | A * | 3/1996 | Saito | B23K 11/3072 29/253 |
| 6,049,053 | A * | 4/2000 | Shimada | B23K 11/3072 219/86.1 |
| 6,188,038 | B1 * | 2/2001 | Kazuhiro | B23K 11/3072 219/86.25 |
| 2005/0016967 | A1 * | 1/2005 | Izumi | B23K 11/3072 219/86.8 |
| 2006/0101630 | A1 | 5/2006 | Nakajima et al. | |

FOREIGN PATENT DOCUMENTS

| | | |
|---|---|---|
| JP | 2002-79382 A | 3/2002 |
| JP | 2004216400 A | 8/2004 |
| JP | 2009297772 A | 12/2009 |

OTHER PUBLICATIONS

Extended European Search Report dated Dec. 21, 2018 from corresponding European Patent Application No. 16887832.0, 7 pages.

* cited by examiner

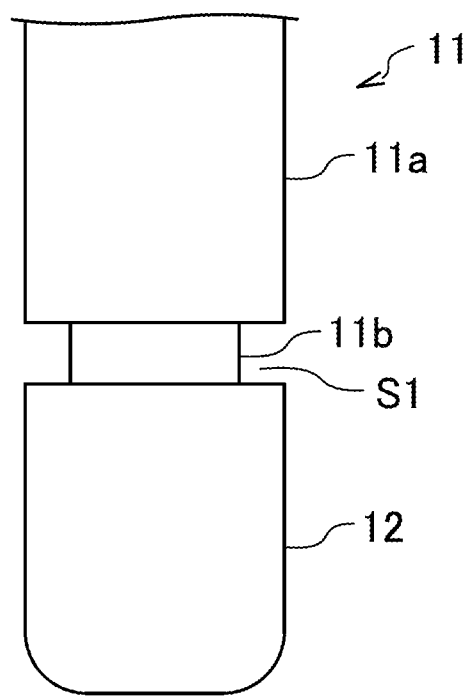
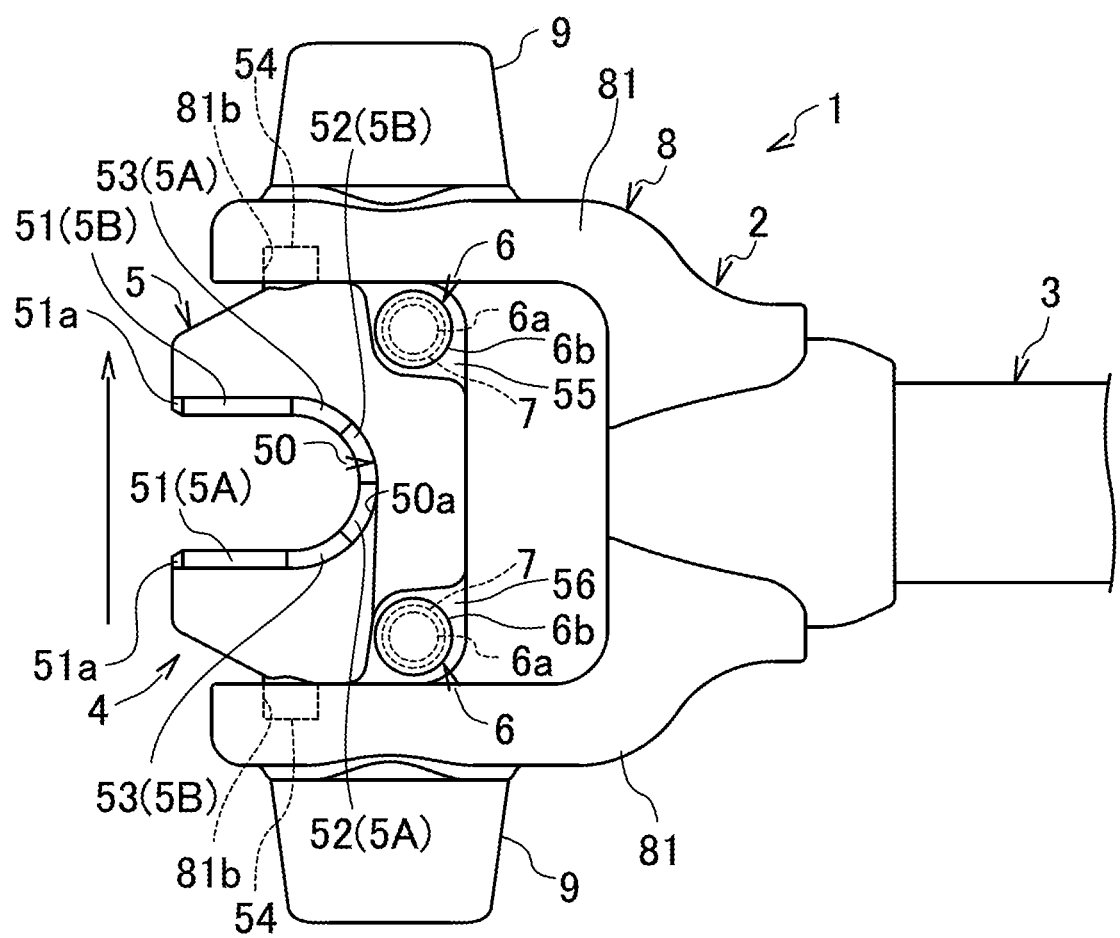
FIG.7

US 10,894,298 B2

ELECTRODE TIP REMOVAL DEVICE AND HAMMER

CROSS-REFERENCE TO RELATED APPLICATION

This application is a continuation of International Application No. PCT/JP2016/000416 filed on Jan. 27, 2016, which is incorporated herein by reference in its entirety and for all purposes.

BACKGROUND

The present disclosure relates to an electrode tip remover for removing an electrode tip attached to a distal end of a welding gun that is used for spot welding, from the distal end of the welding gun. The present disclosure also relates to a hammer including the electrode tip remover.

In general, a distal end of a welding gun used for spot welding has a cylindrical large-diameter portion and a cylindrical small-diameter portion. The small-diameter portion is connected to and has the same center axis as the large diameter portion. An electrode tip is fitted onto the small-diameter portion such that a gap is formed between the electrode tip and the large-diameter portion.

When welding is performed a predetermined number of times, a distal end portion of the electrode tip may wear, or be coated with an oxide film or any other film, and thereby deteriorate in its condition. Therefore, the distal end portion of the electrode tip needs to be periodically cut using a tip dresser. The electrode tip that is periodically cut decreases gradually in its total length and finally becomes unusable. Consequently, the electrode tip needs to be removed from the small-diameter portion of the welding gun at a certain time and a new electrode tip will be attached to the small-diameter portion of the welding gun.

To easily remove the electrode tip from the small-diameter portion of the welding gun, an electrode tip remover is utilized. For example, an electrode tip remover disclosed in Japanese Laid-Open Patent Publication No. 2009-297772 includes a pair of removing members arranged symmetrically in the vertical direction. A tip end of each of the removing members has a nail extending horizontally, while a base end of each of the removing members has a through hole extending vertically through the removing member. The removing members can move toward and away from each other by means of a guide rod inserted through the through holes in the removing members. An upper step portion extending horizontally and having a L-shaped cross section is formed in lower peripheral edge portions of both sides of an upper removing member, while a lower step portion extending horizontally and having a L-shaped cross section that corresponds to the upper step portion is formed in upper peripheral edge portions of both sides of a lower removing member. A pair of arm members extending in the horizontal direction are provided on sides of the removing members so as to sandwich the removing members. The arm members are pivotally supported at respective one ends thereof on a fixed side of an apparatus to be pivotally movable in the vertical direction. At the other end of each of the arm members, a pair of pins are arranged in parallel at a predetermined interval in the direction that the arm member extends. The pins are fitted between the upper step portion and the lower step portion at an associated one of the sides of the removing members.

For removing the electrode tip from the small-diameter portion, the welding gun is lowered in a state where the removing members are brought closer to each other and the nails are fitted into the gap, so that the large-diameter portion of the welding gun presses the upper removing member downward and thereby both of the removing members move downward while being guided by the guide rod, causing each of the upper step portions of the upper removing member to press the corresponding pins of the arm members downward. When the welding gun is further lowered, the arm members are both pivotally moved downward to cause the two pins of each of the arm members to move away gradually from each other in the vertical direction and thereby the removing members are separated from each other, while moving downward. With this separation movement, one of the nails presses the electrode tip in a direction away from the large-diameter portion and the other is pressed against the large-diameter portion, enabling removal of the electrode tip from the small-diameter portion.

A nail of a removing member may be small in thickness as needed to be inserted in a gap between a large-diameter portion of a welding gun and an electrode tip. On the other hand, the nail is subjected to greater load when an electrode tip is removed. Therefore, there is a need to design to have higher rigidity around the nail of the removing member.

In the electrode tip remover described in Japanese Patent Publication No. 2009-297772, the removing members include the upper or lower step portions to fit the pins of each of the arm members for separating the removing members. This causes lower section modulus in portions continuous with the nails of the removing members, resulting in lower rigidity. When the removing action is repeated, deformation and damage may occur in the portions continuing with the nails of the removing members.

In a case where the portions continuous with the nails are designed to have higher section modulus in order to avoid such undesired condition, a removing member may be larger, resulting in a bulky apparatus.

In view of the foregoing background, an object of the present disclosure is therefore to provide an electrode tip remover that is smaller and prevented from being deformed and damaged, and a hammer having the electrode tip remover.

SUMMARY

To achieve the object, the present disclosure is devised to move removing members toward and away from each other without the step portions provided in each removing member as described in JP2009-297772.

Specifically, the present disclosure is directed to an electrode tip remover for removing an electrode tip from a welding gun used for spot welding. The welding gun has a cylindrical large-diameter portion and a cylindrical small-diameter portion that axially aligns with and is connected to the large-diameter portion. The electrode tip is fitted onto the small-diameter portion such that a gap is provided between the electrode tip and the large-diameter portion. The present disclosure provides the following solutions.

According to a first aspect of the disclosure, the electrode tip remover includes: a pair of removing members each having a nail and a protrusion, the nail capable of being inserted into the gap, the protrusion extending in a direction intersecting with a direction of insertion of the nail into the gap, the pair of removing members capable of moving toward and away from each other, and being arranged symmetrically, in a direction intersecting with directions of the insertion of the nail and of extension of the protrusion; and an arm member extending in the direction of the insertion of the nail and having on one end thereof a first support portion that axially supports the protrusion of one of the removing members and a second support portion that axially supports the protrusion of the other one of the removing members. The first support portion is in a shape of a groove or slot that is shaped to be gradually closer to the other one of the removing members as progressing toward the other end of the arm member. When the electrode tip is removed from the small-diameter portion, the arm member is pressed at the other end thereof in a direction of the one of the removing members with the removing members being close together and with the nails being inserted in the gap, to pivotally move the arm member about the protrusion of the other one of the removing members, and thereby the first support portion guides the protrusion of the one of the removing members to move the one of the removing members apart from the other one of the removing members, causing one of the nails to press the electrode tip in a direction away from the large diameter portion and the other one of the nails to be pressed against the large diameter portion, so as to remove the electrode tip from the small-diameter portion.

According to a second aspect of the disclosure which is an embodiment of the first aspect of the disclosure, the first support portion is curved around a pivot axis of the arm member to be generally arc-shaped.

According to a third aspect of the disclosure which is an embodiment of the first or second aspect of the disclosure, the second support portion is in a shape of a groove or slot that is shaped to be gradually closer toward the one of the removing members as progressing to the other end of the arm member. When the electrode tip is removed from the small-diameter portion, the arm member is pressed at the other end thereof in a direction of the other one of the removing members with the removing members being close together and with the nails being inserted in the gap, to pivotally move the arm member about the protrusion of the one of the removing members, and thereby the second support portion guides the protrusion of the other one of the removing members to move the other one of the removing members apart from the one of the removing members, causing one of the nails to press the electrode tip in a direction away from the large diameter portion, and the other one of the nails to be pressed against the large diameter portion, so as to remove the electrode tip from the small-diameter portion.

According to a fourth aspect of the disclosure which is an embodiment of any one of the first to third aspects of the disclosure, the removing members each have a through hole extending therethrough in a direction intersecting with the directions of the insertion of the nail and of the extension of the protrusion. The through holes of the removing members are formed to correspond in position to each other and have a guide pin inserted therethrough. The guide pin is configured to guide both of the removing members to be able to move toward and away from each other. The guide pin has a coil spring wound therearound to bias the removing members towards each other.

According to a fifth aspect of the disclosure which is an embodiment of any one of the first to fourth aspects of the disclosure, the removing members each have at a tip end thereof a fitting recess which opens toward the large diameter portion or the electrode tip and which fits with the large-diameter portion or the electrode tip when the removing members are brought closer to the large-diameter portion or the electrode tip. The fitting recess has one or more of the nails.

According to a sixth aspect of the disclosure which is an embodiment of the fifth aspect of the disclosure, the nails of the one of the removing members have a thickness corresponding to the gap and a plurality of the nails are provided at equal intervals along the fitting recess, the nails of the other one of the removing members have a thickness corresponding to the gap and a plurality of the nails are provided at equal intervals along the fitting recess. When the one and the other one of the removing members are brought closer to each other, the nails of the one and the other one of the removing members are placed alternately therebetween.

According to a seventh aspect of the disclosure which is an embodiment of the fifth or sixth aspect of the disclosure, the arm member has on the one end thereof a pair of extending support portions. The extending support portions extend in the direction of the insertion of the nail and are spaced apart from one another in the direction of the extension of the protrusion. The extending support portions each have the first and second support portions. The protrusion of the one of the removing members includes a pair of protrusions projecting in directions away from each other so as to be axially supported by respective ones of the first support portions of the extending support portions. The protrusion of the other one of the removing members includes a pair of protrusions projecting in directions away from each other so as to be axially supported by respective ones of the second support portions of the extending support portions.

According to an eighth aspect of the disclosure which is an embodiment of the seventh aspect of the disclosure, the pair of the protrusions of each removing member are formed thereon to align centers of the protrusions with a center axis of the large and small-diameter portions in a state where the large-diameter portion or the electrode tip is fitted into the fitting recess.

According to a ninth aspect of the disclosure, a hammer includes an electrode tip remover of the seventh or eighth aspect of the disclosure, an operating rod provided on the other end of the arm member and configured to be held by an operator during operation, and an impacting member attached on a side of the extending support portion opposite to the removing member.

In the first aspect of the disclosure, the removing members can move away from each other by pivotally moving the arm member, without the step portions of each removing member as described in Japanese Patent Publication No. 2009-297772. The entire configuration of each of the removing members thus can be smaller, while being designed to have higher section modulus in portions continuous with the nail of the removing member. The remover can be reduced in size and prevented from being deformed and damaged in the portions continuous with the nail of the removing member even with repeated removal actions.

In the second aspect of the disclosure, when the protrusion of the one of the removing members is guided by the first support portion due to the pivotal movement of the arm member, frictional resistance is reduced between the protrusion and the first support portion, enabling the protrusion of the one of the removing members to move smoothly within the first support portion. This results in reduction of operation load applied by the pivotal movement of the arm member.

In the third aspect of the disclosure, the electrode tip can be removed even when the arm member is pivotally moved in a different direction. For example, when the electrode tip is manually removed, more operation options for an operator can be achieved.

In the fourth aspect of the disclosure, after the electrode tip is removed and the nails are separated from the large-diameter portion and the electrode tip, the removing members move toward each other due to biasing force of the coil spring. The removing members are thus automatically set to be ready for the next removal of an electrode tip, enabling efficient operations when repeating the removal of electrode tips.

In the fifth aspect of the disclosure, when the removing members are each brought closer to the large-diameter portion or the electrode tip, the nails are inserted in the gap between the large-diameter portion and the electrode tip, and the large-diameter portion and the electrode tip are fitted with the fitting recesses. Therefore, the large-diameter portion and the electrode tip are supported by the respective fitting recesses when the removing members are separated from each other, and thereby the separation movement of the removing members is stabilized, leading to the smooth removal of the electrode tip.

In the sixth aspect of the disclosure, the removing members are brought closer to each other and thereby the nails of the one and the other one of the removing members, both of which have the same thickness, are alternately arranged in a line along the fitting recess. When the removing members close together are moved closer to the large-diameter portion and the electrode tip, the nails of the removing members are all inserted at a time in the gap between the large-diameter portion and the electrode tip. The arm member is then pivotally moved and the nails provided at equal intervals in each removing member thus apply force uniformly to the large-diameter portion and the electrode tip, so that the large-diameter portion and the electrode tip are moved linearly away from one another along the center axis of the electrode tip, enabling the efficient removal of the electrode tip from the small-diameter portion. The thickness of the nails of the removing members matches the gap between the large-diameter portion and the electrode tip. This enables higher rigidity of the nails of the removing members in the direction that the nails press the large-diameter portion and the electrode tip, ensuring prevention of breaking in portions continuous with the nails of the removing members.

In the seventh aspect of the disclosure, each of the removing members is supported at two points on the arm member and thus it can be further stabilized that the arm member pivotally moves around the protrusions and that the removing members move closer and away from each other.

In the eighth aspect of the disclosure, the large diameter portion or the electrode tip is subjected to force applied by the pivotal movement of the arm member via each removing member along the plane including the center axis of the large diameter portion or the electrode tip. This enables a decrease in resistance exerted when the large diameter portion and the electrode tip are pulled away, and a minimum required load for operation of the arm member during the removal.

In the ninth aspect of the disclosure, an operator holds the operating rod and performs the insertion of the nails of the removing members into the gap between the large diameter portion and the electrode tip, as well as the pivotal movement of the arm member. This allows facilitating the removal of the electrode tip performed manually. When a new electrode tip is attached to the small diameter portion after completing the removal of the electrode tip, the new electrode tip is then hit with the impacting member onto the small diameter portion to be held firmly thereon. Moreover, the operator can continuously remove and attach electrode tips while holding the same operating rod, allowing an efficient replacement of the electrode tips.

BRIEF DESCRIPTION OF THE DRAWINGS

FIG. 7 is a view showing a state where an electrode tip is being attached to a distal end of a welding gun using the hammer having the electrode tip remover according to the first embodiment of the present disclosure.

DETAILED DESCRIPTION

Embodiments of the present disclosure will now be described in detail with reference to the drawings. Note that the following description of preferable embodiments is merely illustrative in nature.

First Embodiment of Disclosure

Figure 1:
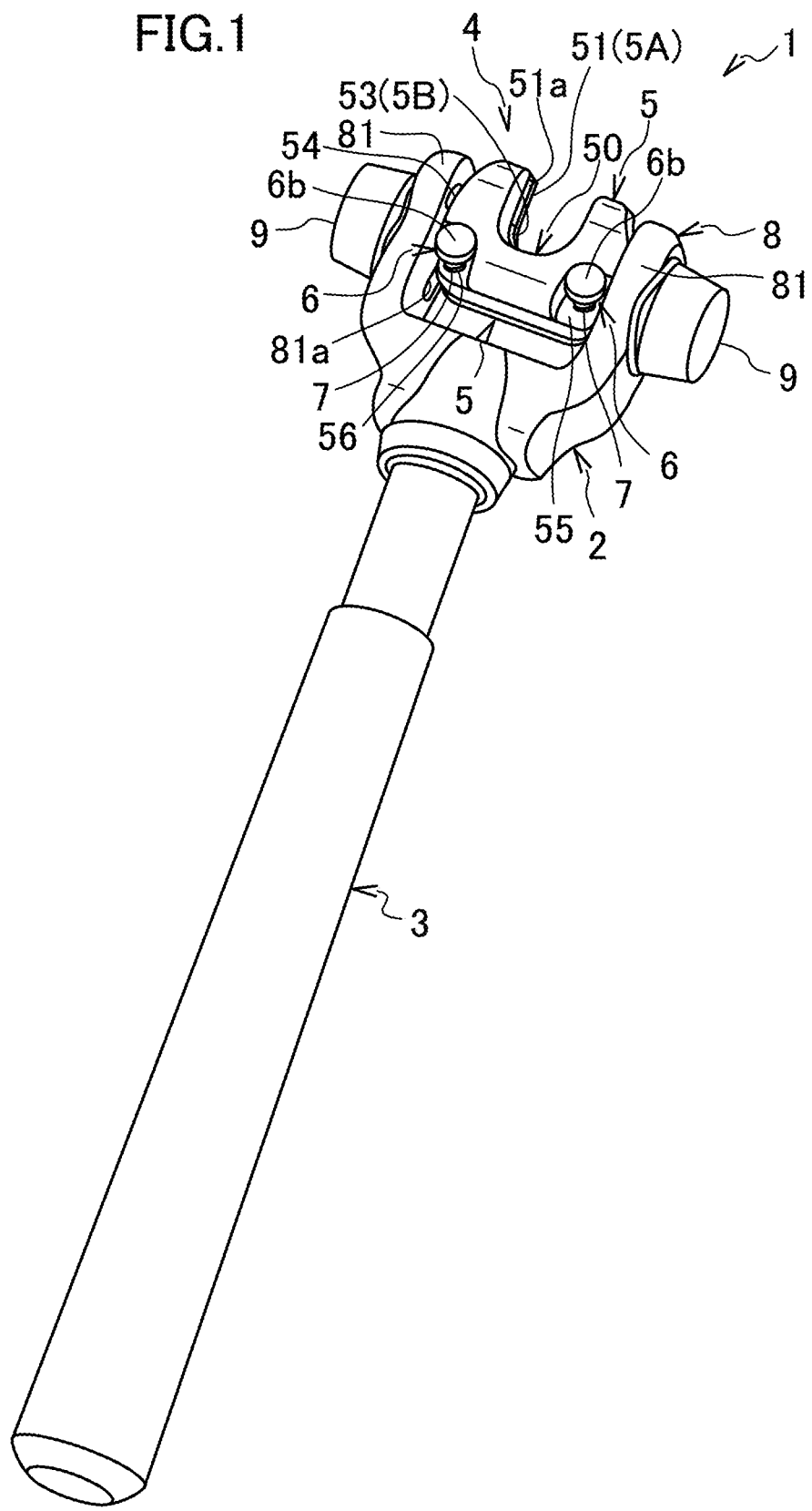
FIG. 1 is a perspective view of a hammer having an electrode tip remover according to a first embodiment of the present disclosure.
Figure 2:
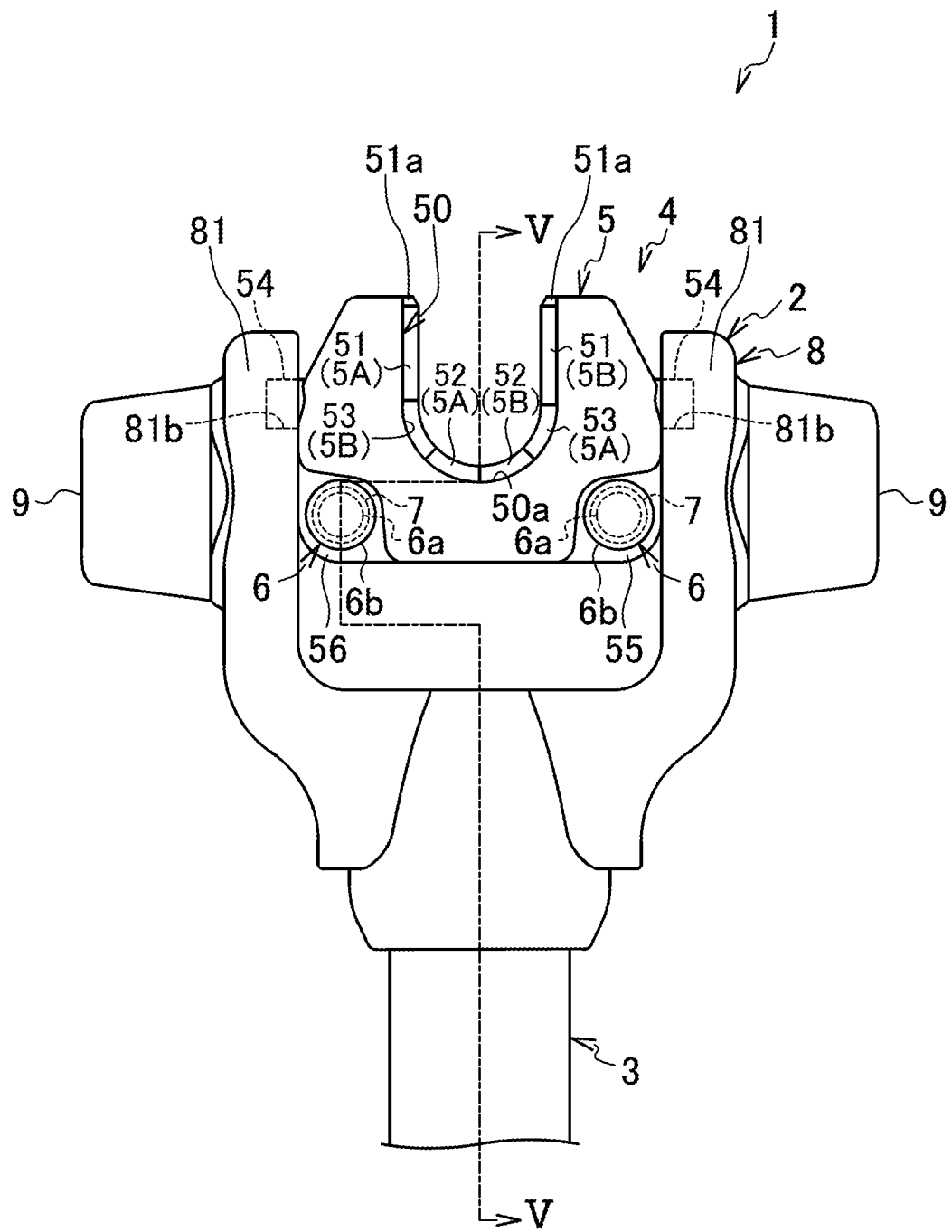
FIG. 2 is an enlarged top view of a hammer body of the hammer having the electrode tip remover according to the first embodiment of the present disclosure.
Figure 3:
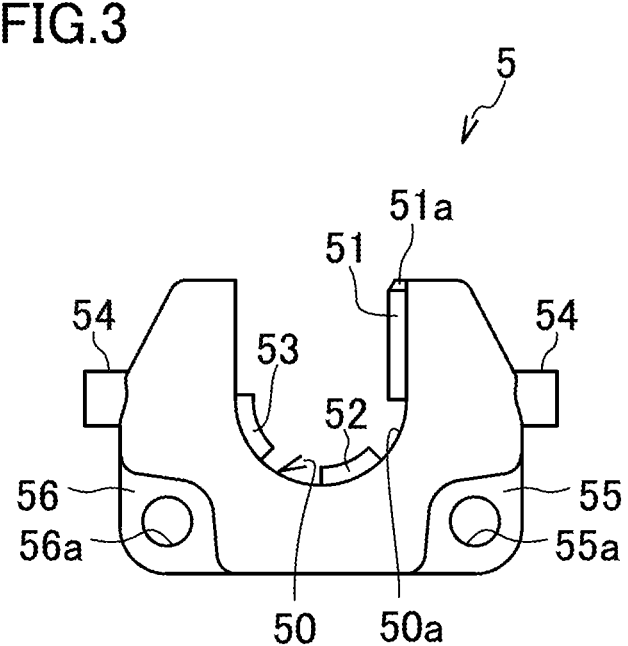
FIG. 3 shows a removing member of the electrode tip remover according to the first embodiment of the present disclosure as viewed from above the front surface of the removing member.

FIGS. 1 and 2 illustrate a hammer 1 according to a first embodiment of the present disclosure. The hammer 1 is used to remove and attach an electrode tip 12 from/to a distal end of a welding gun 11 for spot welding. The hammer 1 includes a hammer body 2 that is substantially T-shaped as viewed in plan and an operating rod 3 that is held by an operator during operation.

The welding gun 11 is general one held and used by an industrial robot (not shown). A large diameter portion 11a and small-diameter portion 11b having the same center axis 11c and connected to each other are provided at the distal end of the welding gun 11.

The electrode tip 12 is fitted and attached to the small-diameter portion 11b such that the center axis 12a of the electrode tip 12 is aligned with the center axis 11c of the large and small diameter portions 11a, 11b and a gap S1 is provided between the electrode tip 12 and the large-diameter portion 11a.

As illustrated in FIG. 2, the hammer body 2 includes an electrode tip remover 4 for removing the electrode tip 12 from the small diameter portion 11b.

As illustrated in FIGS. 3 to 6, the electrode tip remover 4 is in the shape of a plate having a thickness and includes a pair of metallic removing members 5. Each of the removing members 5 is branched off into two parts toward a tip end thereof to be substantially U-shaped as viewed in plan. The removing members 5 are arranged symmetrically such that their back surfaces face each other and that their tip ends are oriented in the same direction.

Each of the removing members 5 has at its tip end a fitting recess 50 opening toward the large diameter portion 11a or the electrode tip 12. A half portion of the fitting recess 50 facing away from the opening thereof has a curved surface 50a conforming in shape to an outer peripheral surface of the large-diameter portion 11a or the electrode tip 12.

When the removing members 5 are brought closer to the large-diameter portion 11a and the electrode tip 12, the large-diameter portion 11a and the electrode tip 12 are fitted into the fitting recesses 50.

Figure 4:
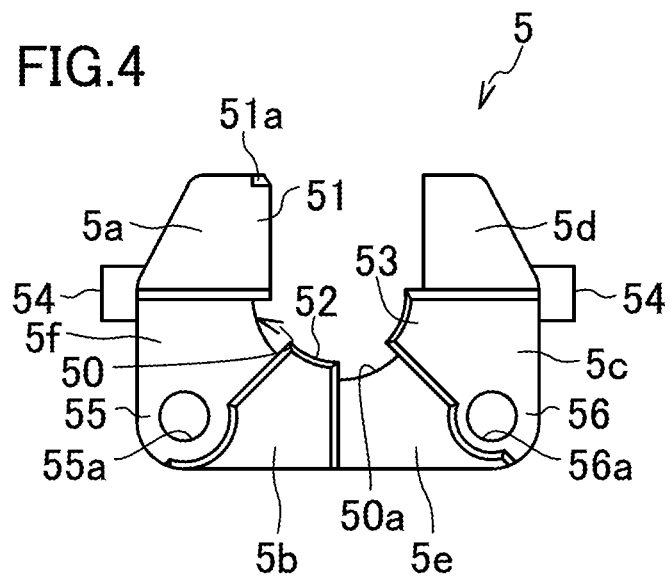
FIG. 4 shows a removing member of the electrode tip remover according to the first embodiment of the present disclosure as viewed from above the back surface of the removing member.

As illustrated in FIG. 4, a first, second and third raised surface parts 5a, 5b, 5c are provided in the back surface of each of the removing members 5. The first, second and third raised surface parts 5a, 5b, 5c have a flat raised surface and are provided in that order at predetermined intervals along the corresponding fitting recess 50.

The first, second and third raised surface parts 5a, 5b, 5c are elevated by the same amount and the elevated amount matches the gap S1.

The first raised surface part 5a is formed on one branched portion on the tip end side of the removing member 5. A linear edge portion of the first raised surface part 5a adjacent to the fitting recess 50 extends inward from the fitting recess 50 to form a first nail 51.

The first nail 51 is thus formed along a linear portion of the opening side of the fitting recess 50 and has a thickness that matches the gap S1.

The first raised surface part 5a includes a pointed portion 51a on the fitting recess 50 opening side of the first raised surface part 5a. The pointed portion 51a gradually decreases in thickness toward the opening of the fitting recess 50.

The second raised surface part 5b is formed between the middle and one corner of a base end portion of the removing member 5 and substantially triangular in shape such that its width decreases toward the fitting recess 50.

An edge portion of the second raised surface part 5b adjacent to the fitting recess 50 corresponds to the curved surface 50a of the fitting recess 50 and extends inward from the fitting recess 50 to form a second nail 52.

The second nail 52 thus has a curved-shape along the curved surface 50a of the fitting recess 50 and has a thickness that matches the gap S1.

The third raised surface part 5c is formed between the other corner of the base end portion of the removing member 5 and the middle of the other branched portion on the tip end side of the removing member 5, and substantially triangular in shape such that its width decreases toward the fitting recess 50.

An edge portion of the third raised surface part 5c adjacent to the fitting recess 50 corresponds to the curved surface 50a of the fitting recess 50 and extends inward from the fitting recess 50 to form a third nail 53.

The third nail 53 thus has a curved-shape along the curved surface 50a of the fitting recess 50 and has a thickness that matches the gap S1.

The first, second and third nails 51, 52, 53 of the removing member 5 are provided at equal intervals in the direction that the fitting recess 50 is curves.

For reasons of convenience, the first, second and third nails 51, 52, 53 of one of the removing members 5 are hereinafter each referred to as nails 5A, while the first, second and third nails 51, 52, 53 of the other one of the removing members 5 are each referred to as nails 5B.

A first stepped surface part 5d is provided on the back surface of the other branched portion of the removing member 5 on the tip end side thereof. The first stepped surface part 5d is positioned adjacent to the third raised surface part 5c. The shape of a stepped surface of the first stepped surface part 5d corresponds to that of a raised surface of the first raised surface part 5a.

A second stepped surface part 5e is then provided between, and positioned adjacent to, the second raised surface part 5b and the third raised surface part 5c of the removing member 5. The shape of a stepped surface of the second stepped surface part 5e corresponds to that of a raised surface of the second raised surface part 5b.

Further, a third stepped surface part 5f is provided between, and positioned adjacent to, the first raised surface part 5a and the second raised surface part 5b of the removing member 5. The shape of a stepped surface of the third stepped surface part 5f corresponds to that of a raised surface of the third raised surface part 5c.

Once the removing members 5 are brought closer to each other, the first raised surface part 5a of the one of the removing members 5 fits on the first stepped surface part 5d of the other one of the removing members 5, while the first raised surface part 5a of the other one of the removing members 5 fits on the first stepped surface part 5d of the one of the removing members 5. The second raised surface part 5b of the one of the removing members 5 then fits on the second stepped surface part 5e of the other one of the removing members 5, while the second raised surface part 5b of the other one of the removing members 5 fits on the second stepped surface part 5e of the one of the removing members 5. Further, the third raised surface part 5c of the one of the removing members 5 fits on the third stepped surface part 5f of the other one of the removing members 5, while the third raised surface part 5c of the other one of the removing members 5 fits on the third stepped surface part 5f of the one of the removing members 5.

Therefore, when the removing members 5 are moved closer to each other, the nails 5A, 5B of the one and the other one of the removing members 5 are alternately placed therebetween, allowing the nails 5A and 5B of the one and other one of the removing members 5 to be arranged in a line along the fitting recess 50. As the fitting recess 50 is brought closer to the large diameter portion 11a or the electrode tip 12 with the removing members 5 close together, the nails 5A, 5B of the removing members 5 are all inserted into the gap S1 at a time.

There are provided a pair of protrusions 54 in the middle of outer surfaces of the branched portions of each removing member 5. The protrusions 54 extend in the directions intersecting with the direction of the insertion of the nails 5A, 5B, and opposite from each other.

Figure 5:
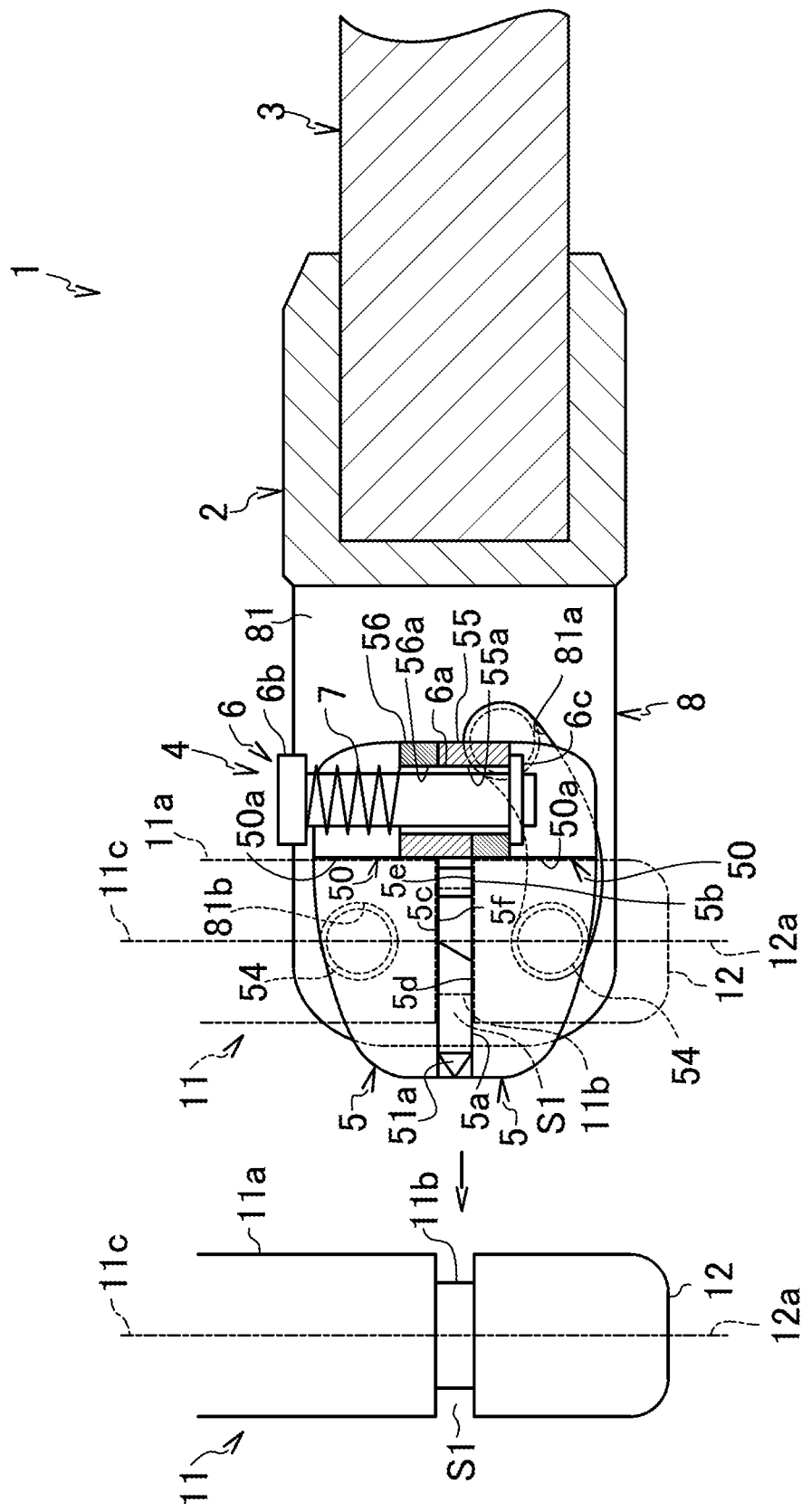
FIG. 5 is a cross-sectional view taken along the line V-V in FIG. 2.
Figure 6:
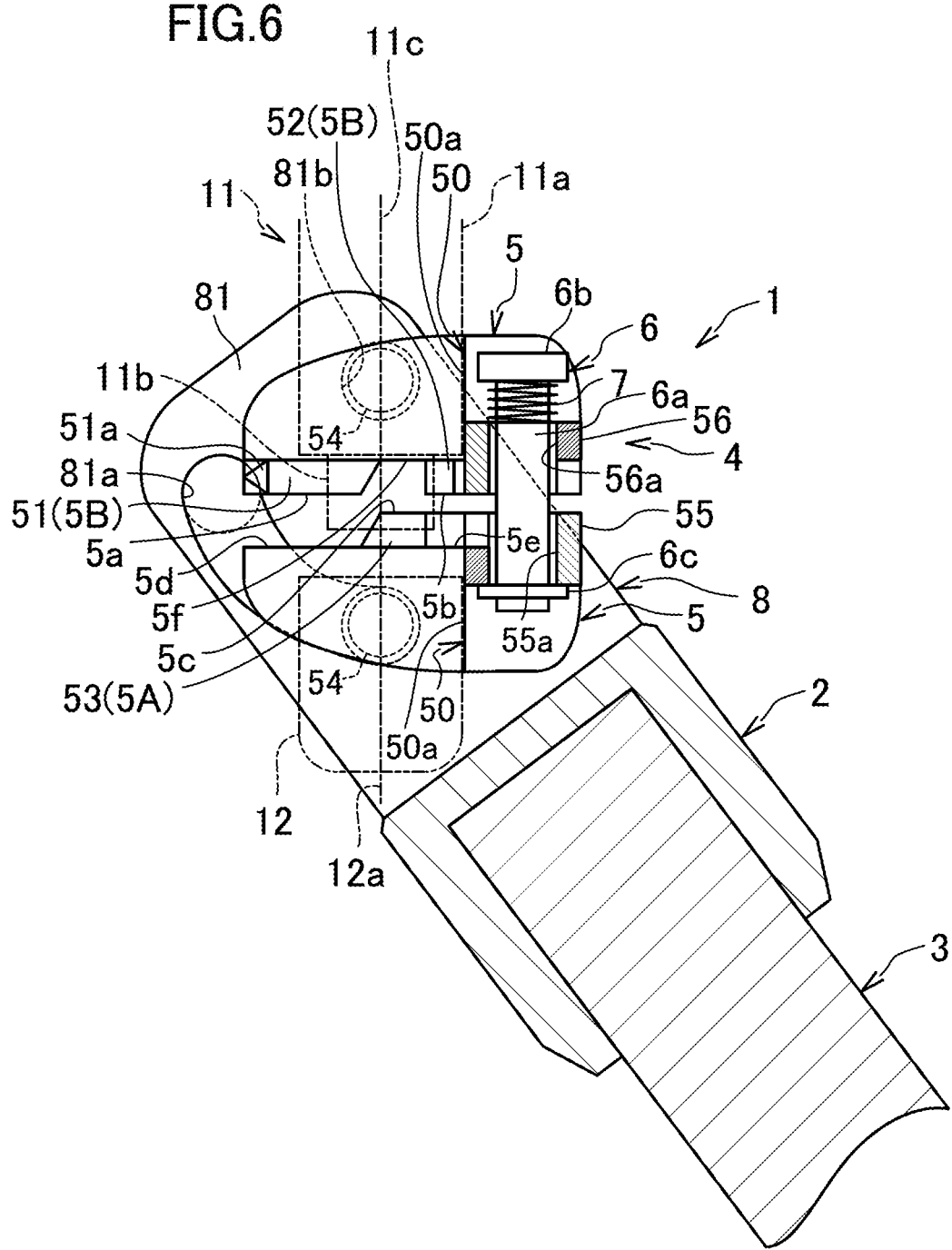
FIG. 6 is a view showing a state immediately after an electrode tip is removed from a distal end of a welding gun following the state shown in FIG. 5.

As illustrated in FIGS. 5 and 6, the protrusions 54 are provided on the removing member 5 such that the centers of the protrusions 54 aligns with the center axis 11c of the large and small diameter portions 11a, 11b as the large-diameter portion 11a or the electrode tip 12 is fitted into the fitting recess 50.

The corners of the base end of the removing member 5 have respective first and second thin portions 55, 56 formed such that the front surface of the removing member 5 is depressed.

The first thin portion 55 has a first through hole 55a formed therein and which extends through in directions intersecting with the directions of the insertion of the nails 5A, 5B and of the extension of the protrusions 54. The second thin portion 56 has a second through hole 56a formed therein and which extends through in directions intersecting with the directions of the insertion of the nails 5A, 5B and of the extension of the protrusions 54. Accordingly, the first through hole 55a of the one of the removing members 5 is at a position corresponding to the second through hole 56a of the other one of the removing members 5, while the first through hole 55a of the other one of the removing members 5 is at a position corresponding to the second through hole 56a of the one of the removing members 5.

The electrode tip remover 4 includes a pair of guide pins 6 having a shaft 6a and a head 6b.

The shaft 6a of each guide pin 6 is inserted from the other one of the removing members 5 through the first and second through holes 55a, 56a facing one another. The shaft 6a of each guide pin 6 guides a movement of the removing members 5 moving toward and away from each other.

The shaft 6a of each guide pin 6 has at its tip end a washer 6c fitted thereover such that the shaft 6a is not detached from the first and second through holes 55a, 56a.

A coil spring 7 is then wound around the shaft 6a of each of the guide pins 6.

Each of the coil springs 7 abuts at one end thereof the head 6b of an associated one of the guide pins 6, while abutting at the other end thereof the surface of the other one of the removing members 5. Biasing force of the coil springs 7 causes the removing members 5 to move closer to each other.

The electrode tip remover 4 includes an arm member 8 supporting the removing members 5.

The arm member 8 is, at one end thereof, provided with a pair of extending support portions 81 that extend in the direction of the insertion of the nails 5A, 5B into the gap S1 and are spaced apart from each other in the direction of the extension of the protrusions 54. The arm member 8 includes the operating rod 3, one end of which is secured at the other end of the arm member 8.

The extending support portions 81 are positioned on respective ones of the sides of the removing members 5 and include first support portions 81a that axially support respective ones of the protrusions 54 of the one of the removing members 5 and second support portions 81b that axially support respective ones of the protrusions 54 of the other one of the removing members 5.

The first support portions 81a of the extending support portions 81 thus axially support respective ones of the protrusions 54 of the one of the removing members 5, while the second support portions 81b of the extending support portions 81 axially support respective ones of the protrusions 54 of the other one of the removing members 5.

Each of the first support portions 81a is shaped to be gradually closer to the other one of the removing members 5 as progressing to the other end of the arm member 8 and is in the shape of a groove that is curved around the corresponding second support portion 81b to be substantially arc shaped. The first support portions 81a axially support and guide respective ones of the protrusions 54, so that the protrusions 54 axially supported by the second support portions 81b become a pivot axis of the arm member 8, enabling the arm member 8 to pivotally move around the pivot axis.

Each of the extending support portions 81 has on its side opposite to the removing members 5 a rubber impacting member 9 attached thereto. The impacting member 9 has a short, cylindrical shape.

As shown in FIG. 5, when removing the electrode tip 12 from the small diameter portion 11b, an operator uses the operating rod 3 to press the other end of the arm member 8 in the direction of the one of the removing members 5 in a state where the removing members 5 are brought closer to each other and the nails 5A, 5B are inserted into the gap S1. As shown in FIG. 6, the arm member 8 is pivotally moved around the protrusions 54 of the other one of the removing members 5 to guide the protrusion 54 of the one of the removing members 5 through respective ones of the first support portions 81a, enabling the one of the removing members 5 to move away from the other one of the removing members 5 against biasing force of the coil springs 7. The movement of the one of the removing members 5 away from the other one of the removing members 5 allows the nails 5A of the one of the removing members 5 to press the electrode tip 12 in the direction away from the large diameter portion 11a, and the nails 5B of the other one of the removing members 5 to press against the large diameter portion 11a, resulting in the removal of the electrode tip 12 from the small diameter 11b.

As shown in FIG. 7, when attaching the electrode tip 12 to the small diameter portion 11b, the operator holds the operating rod 3 and hits the distal end portion of the electrode tip 12 with the impacting member 9 in a state where the electrode tip 12 is fitted onto the small diameter portion 11b, thereby enabling the electrode tip 12 to be firmly held in the small diameter portion 11b.

Replacement of an electrode tip 12 using the hammer 1 is then described.

An operator first moves closer to a welding gun 11 from which an electrode tip 12 is removed, and holds an operating rod 3 of the hammer 1 to insert the nails 5A, 5B into a gap S1 between a large diameter portion 11a and the electrode tip 12 that are located at the distal end of the welding gun 11, as shown in FIG. 5. Then, curved surfaces 50a of one and the other one of removing members 5 correspond to outer peripheral surfaces of the electrode tip 12 and the large diameter portion 11a, respectively.

As shown in FIG. 6, the operator then tilts the operating rod 3 in a direction of the one of the removing members 5. The arm member 8 is thus pressed at another end thereof in the direction of the one of the removing members 5, so that the operating rod 3 and the arm member 8 are pivotally moved about protrusions 54 of the other one of the removing members 5.

The pivotal movement of the arm member 8 causes each of the first support portions 81a to guide an associated one of protrusions 54 of the one of the removing members 5 to move the one of the removing members 5 away from the other one of the removing members 5 against biasing force of the coil springs 7. Accordingly, the nails 5A of the one of the removing members 5 push the electrode tip 12 in the direction away from the large diameter portion 11a, while the nails 5B of the other one of the removing members 5 are pressed against the large diameter portion 11a, allowing the electrode tip 12 to be detached from the small diameter portion 11b.

Thereafter, the operator fits a new electrode tip 12 to the small diameter portion 11b. As shown in FIG. 7, the operator then hits the tip end of the new electrode tip 12 with the impacting member 9. The new electrode tip 12 is thus firmly held onto the small diameter portion 11b and the replacement of the electrode tip 12 is completed.

According to the first embodiment of the present disclosure, the removing members 5 thus can move apart from each other by pivotally moving the arm member 8 without step portions of the removing members 5 as described in Japanese Patent Publication No. 2009-297772. Therefore, portions continuous with the nails 5A, 5B of the removing members 5 can be designed to have higher section modulus, while the entire configuration of the removing member 5 is made smaller. The electrode tip remover 4 thus can be reduced in size and prevented from being deformed and damaged in the portions continuous with the nails 5A, 5B of the removing members 5 even when the removals are repeated.

The first support portion 81a is curved around the second support portion 81b to be substantially arc-shaped. This causes less frictional resistance between the protrusions 54 and the first support portions 81a when the first support portions 81a guide respective ones of the protrusions 54 of the one of the removing members 5 by pivotally moving the arm member 8. As a result, the protrusions 54 of the one of the removing members 5 can smoothly move along the first support portions 81a and load applied due to the pivotal movement of the arm member 8 can be reduced.

After the removal of the electrode tip 12 is completed and the nails 5A and 5B of the one and the other one of the removing members 5 are separated from the large-diameter portion 11a and the electrode tip 12, the removing members 5 move toward each other due to biasing force of the coil springs 7. The removing members 5 are thus automatically set to be ready for the removal of a next electrode tip 12, enabling efficient operation for repeating the removal of electrode tips 12.

When the removing members 5 are brought near the large-diameter portion 11a and the electrode tip 12, the nails 5A, 5B are inserted into the gap S1 between the large-diameter portion 11a and the electrode tip 12 to fit the large-diameter portion 11a and the electrode tip 12 into fitting recesses 50. The large-diameter portion 11a and the electrode tip 12 are thus supported by the corresponding fitting recesses 50 as the removing members 5 are moved away from each other, enabling the removing members 5 to stably back away, and the electrode tip 12 to be smoothly removed.

When the removing members 5 are placed in close proximity to each other, the nails 5A and 5B of the one and the other one of the removing members 5, which have the same thickness, are arranged alternately in a line along the fitting recesses 50. Once the removing members 5 close together are brought near the large diameter portion 11a and the electrode tip 12, the nails 5A, 5B of the removing members 5 are all inserted at a time into the gap S1 between the large diameter portion 11a and the electrode tip 12. The arm member 8 is then pivotally moved and the nails 5A, 5B each provided at equal intervals in the corresponding removing member 5 thus apply force uniformly to the large-diameter portion 11a and the electrode tip 12. This causes the large-diameter portion 11a and the electrode tip 12 to be linearly moved away from each other along the center axis 12a of the electrode tip 12, enabling the efficient separation of the electrode tip 12 from the small-diameter portion 11b. Moreover, the thickness of the nails 5A, 5B of the removing members 5 matches the gap S1 between the large-diameter portion 11a and the electrode tip 12, thereby enabling higher rigidity of the nails 5A, 5B of the removing members 5 in the direction that the nails 5A, 5B press the large-diameter portion 11a or the electrode tip 12. This ensures prevention of breaking of the portions continuous with the nails 5A, 5B in the removing members 5.

A pair of extending support portions 81 of the arm member 8 support the removing members 5 to stabilize the pivotal movement of the arm member 8 around the protrusions 54 and the movement of the removing members 5 toward and away from each other.

The centers of the protrusions 54 of each removing member 5 align with the center axis 11c of the large and small diameter portions 11a, 11b when the electrode tip 12 is removed. Force caused by the pivotal movement of the arm member 8 is applied via the removing members 5 to the large-diameter portion 11a and the electrode tip 12 along a plane including the center axes 11c, 12a of the large-diameter portion 11a and the electrode tip 12. This enables a decrease in resistance applied when the large diameter portion 11a and the electrode tip 12 are pulled away, and a minimum load required for operations of the arm member 8 during the removal.

An operator, while holding the operating rod 3, can insert the nails 5A, 5B of the removing members 5 into the gap S1 between the large diameter portion 11a and the electrode tip 12 as well as pivotally move the arm member 8. This facilitates the removal of the electrode tip 12 performed manually. When a new electrode tip 12 is attached to the small diameter portion 11b after the electrode tip 12 is removed, the operator can hit the new electrode tip 12 onto the small diameter portion 11b using the impacting member 9 to hold the new electrode tip 12 firmly on the small diameter portion 11b. Moreover, the operator can continuously remove and attach the electrode tip 12 while holding the same operating rod 3, enabling the efficient replacement of the electrode tip 12.

The first support portion 81a according to the first embodiment of the present disclosure can be slot-shaped, while being groove-shaped in the embodiment.

The first support portion 81a according to the first embodiment of the present disclosure can also have a linear shape, while being a curved shape in the embodiment.

The electrode tip remover 4 according to the present disclosure can be used for the electrode tip 12 of the welding gun 11 facing upward, while being used for the electrode tip 12 of the welding gun 11 facing downward in the embodiment.

Second Embodiment of Disclosure

Figure 8:
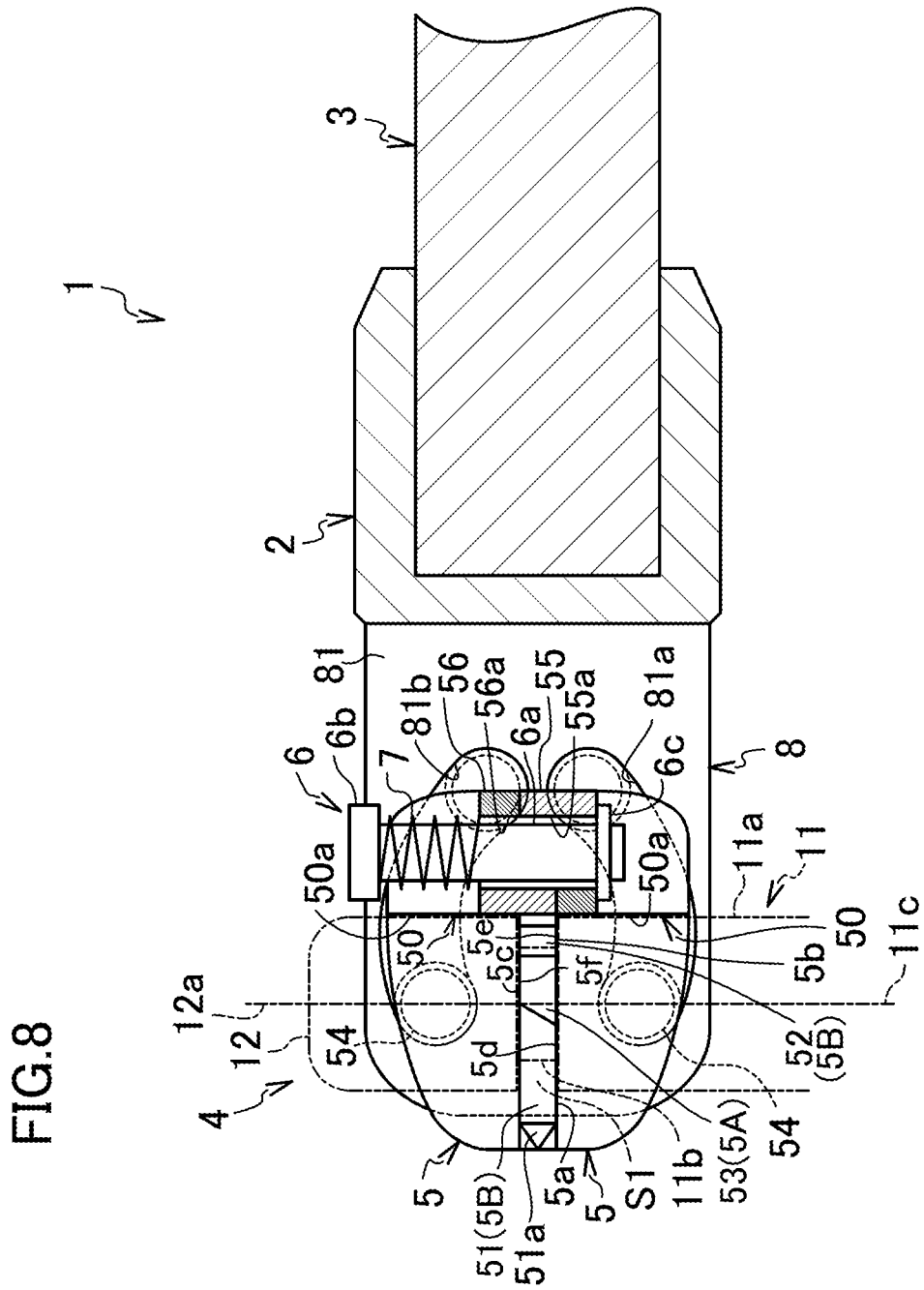
FIG. 8 is a view corresponding to FIG. 5, according to a second embodiment of the present disclosure.
Figure 9:
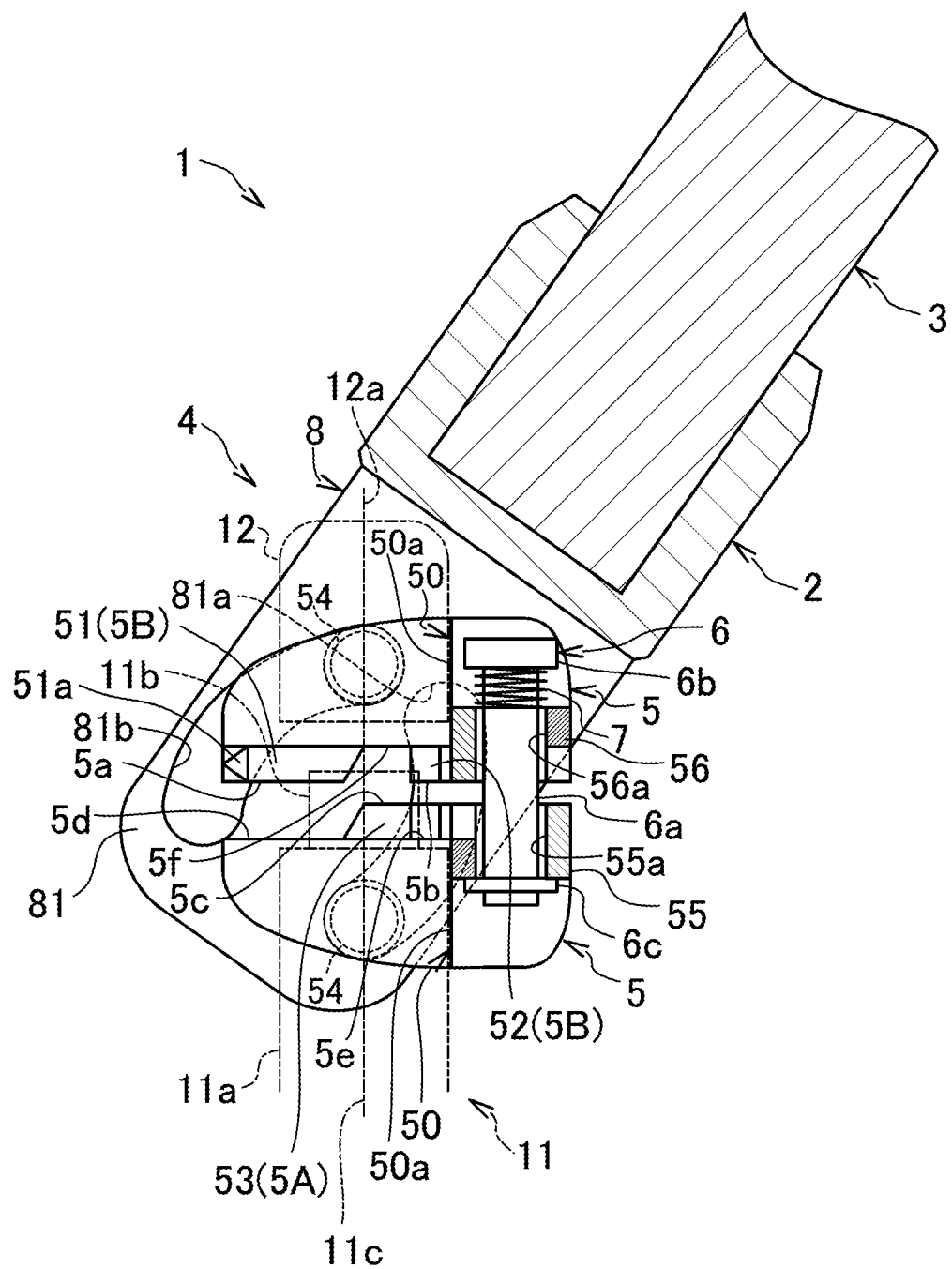
FIG. 9 is a view corresponding to FIG. 6, according to the second embodiment of the present disclosure.

FIGS. 8 and 9 illustrate a hammer 1 according to a second embodiment of the present disclosure. The second embodiment differs from the first embodiment only in a structure of a second support portion 81b of an arm member 8 and use of the hammer 1 for an electrode tip 12 of a welding gun 11 facing upward, while being the same as the first embodiment in relations to other aspects. Only aspects different from the first embodiment will be explained in detail below.

A second support portion 81b of each extending support portion 81 according to the second embodiment is in the shape of a groove that is formed to be gradually closer to one of removing members 5 as progressing to another end of an arm member 8. First and second support portions 81a, 81b of each extending support portion 81 are arranged symmetrically in a direction that the removing members 5 are disposed in parallel.

As illustrated in FIG. 8, when removing an electrode tip 12 from a small diameter portion 11b, an operator uses an operating rod 3 to press another end of the arm member 8 toward the direction of the other one of the removing members 5 in a state where the removing members 5 are brought closer to each other and nails 5A, 5B are inserted into a gap S1. As illustrated in FIG. 9, the arm member 8 is thus pivotally moved around protrusions 54 of the one of the removing members 5 and thereby protrusions 54 of the other one of the removing members 5 are guided by respective ones of the second support portions 81b, enabling the other one of the removing members 5 to move away from the one of the removing members 5 against biasing force of coil springs 7. The movement of the other one of the removing members 5 away from the one of the removing members 5 allows the nails 5B of the other one of the removing members 5 to press the electrode tip 12 in a direction away from a large diameter portion 11a, and the nails 5A of the one of the removing members 5 to be pressed against the large diameter portion 11a, resulting in removal of the electrode tip 12 from the small diameter 11b.

According to the second embodiment of the present disclosure, even when the direction of the pivot movement of the arm member 8 is changed, the removal of the electrode tip 12 can be performed. In the cases that the operator holds the operating rod 3 to remove the electrode tip manually, there are additional and convenient operation options for the operator.

The second support portion 81b according to the second embodiment of the present disclosure can be slot-shaped, while being groove-shaped in the embodiment.

The second support portion 81b according to the second embodiment of the present disclosure can also have a linear shape, while being a curved shape in the embodiment.

A electrode tip remover 4 according to the second embodiment of the present disclosure can be used for the electrode tip 12 of the welding gun 11 facing downward, while being used for the electrode tip 12 of the welding gun 11 facing upward in the embodiment In the first and second embodiments of the present disclosure, each removing member 5 includes, but is not limited to, three nails 5A and three nails 5B. The nails 5A, 5B of each removing member 5 can be one or two. The nails 5A, 5B of each removing member 5 can be four or more.

In the first and second embodiments of the present disclosure, the nails 5A, 5B of each removing member 5 are provided at equal intervals, but may not be at equal intervals.

In the first and second embodiments of the present disclosure, when the electrode tip 12 is removed, the arm member 8 may be pivotally moved manually, but is not limited to that. The arm member 8 can be pivotally moved mechanically and automatically.

The present disclosure is suitable for an electrode tip remover configured to remove an electrode tip mounted to a distal end of a welding gun for use in spot welding, from the distal end of the welding gun, and for a hammer having the electrode tip remover.

The invention claimed is:

1. An electrode tip remover for removing an electrode tip from a welding gun used for spot welding, the welding gun having a cylindrical large-diameter portion and a cylindrical small-diameter portion that axially aligns with and is connected to the large-diameter portion, the electrode tip being fitted onto the small-diameter portion such that a gap is provided between the electrode tip and the large-diameter portion, the electrode tip remover comprising:

a pair of removing members each having a nail and a protrusion, the nail capable of being inserted into the gap, the protrusion extending in a direction intersecting with a direction of insertion of the nail into the gap, the pair of removing members capable of moving toward and away from each other, and being arranged symmetrically, in a direction intersecting with directions of the insertion of the nail and of extension of the protrusion; and an arm member extending in the direction of the insertion of the nail and having on one end thereof a first support portion that axially supports the protrusion of one of the removing members and a second support portion that axially supports the protrusion of the other one of the removing members, wherein the arm member has on the one end thereof a pair of extending support portions, the extending support portions extending in the direction of the insertion of the nail and being spaced apart from one another in the direction of the extension of the protrusion, the extending support portions each having the first and second support portions, wherein the protrusion of the one of the removing members includes a pair of protrusions projecting in directions away from each other to be axially supported by respective ones of the first support portions of the extending support portions, wherein the protrusion of the other one of the removing members includes a pair of protrusions projecting in directions away from each other to be axially supported by respective ones of the second support portions of the extending support portions, wherein the first support portion is in a shape of a groove or slot that is shaped to be gradually closer to the other one of the removing members as progressing toward the other end of the arm member, and when the electrode tip is removed from the small-diameter portion, the arm member is pressed at the other end thereof in a direction of the one of the removing members with the removing members being close together and with the nails being inserted in the gap, to pivotally move the arm member about the protrusion of the other one of the removing members, and thereby the first support portion guides the protrusion of the one of the removing members to move the one of the removing members apart from the other one of the removing members, causing one of the nails to press the electrode tip in a direction away from the large diameter portion, and the other one of the nails to be pressed against the large diameter portion, to remove the electrode tip from the small-diameter portion.

2. The electrode tip remover of claim 1, wherein the first support portion is curved around a pivot axis of the arm member to be generally arc-shaped.

3. The electrode tip remover of claim 1, wherein the second support portion is in a shape of a groove or slot that is shaped to be gradually closer to the one of the removing members as progressing toward the other end of the arm member, when the electrode tip is removed from the small-diameter portion, the arm member is pressed at the other end thereof in a direction of the other one of the removing members with the removing members being close together and with the nails being inserted in the gap, to pivotally move the arm member about the protrusion of the one of the removing members, and thereby the second support portion guides the protrusion of the other one of the removing members to move the other one of the removing members apart from the one of the removing members, causing one of the nails to press the electrode tip in a direction away from the large diameter portion, and the other one of the nails to be pressed against the large diameter portion, to remove the electrode tip from the small-diameter portion.

4. The electrode tip remover of claim 1, wherein
the removing members each have a through hole extending therethrough in a direction intersecting with the directions of the insertion of the nail and of the extension of the protrusion, the through holes of the removing members being formed to correspond in position to each other and having a guide pin inserted therethrough, the guide pin being configured to guide both of the removing members to be able to move toward and away from each other, the guide pin having a coil spring wound therearound to bias the removing members toward each other.

5. The electrode tip remover of claim 1, wherein
the removing members each have at a tip end thereof a fitting recess which opens toward the large diameter portion or the electrode tip and which fits with the large-diameter portion or the electrode tip when the removing members are brought closer to the large-diameter portion or the electrode tip, the fitting recess having one or more of the nails.

6. The electrode tip remover of claim 5, wherein
the nails of the one of the removing members have a thickness corresponding to the gap and a plurality of the nails are provided at equal intervals along the fitting recess,
the nails of the other one of the removing members have a thickness corresponding to the gap and a plurality of the nails are provided at equal intervals along the fitting recess,
when the one and the other one of the removing members are brought closer to each other, the nails of the one and the other one of the removing members are placed alternately therebetween.

7. The electrode tip remover of claim 1, wherein
the pair of the protrusions of each removing member are formed thereon to align centers of the protrusions with a center axis of the large and small-diameter portions in a state where the large-diameter portion or the electrode tip are fitted into the fitting recess.

8. A hammer, comprising:
an electrode tip remover for removing an electrode tip from a welding gun used for spot welding, the welding gun having a cylindrical large-diameter portion and a cylindrical small-diameter portion that axially aligns with and is connected to the large-diameter portion, the electrode tip being fitted onto the small-diameter portion such that a gap is provided between the electrode tip and the large-diameter portion, the electrode tip remover comprising:
a pair of removing members each having a nail and a protrusion, the nail capable of being inserted into the gap, the protrusion extending in a direction intersecting with a direction of insertion of the nail into the gap, the pair of removing members capable of moving toward and away from each other, and being arranged symmetrically, in a direction intersecting with directions of the insertion of the nail and of extension of the protrusion; and
an arm member extending in the direction of the insertion of the nail and having on one end thereof a first support portion that axially supports the protrusion of one of the removing members and a second support portion that axially supports the protrusion of the other one of the removing members,
wherein the arm member has on the one end thereof a pair of extending support portions, the extending support portions extending in the direction of the insertion of the nail and being spaced apart from one another in the direction of the extension of the protrusion, the extending support portions each having the first and second support portions, wherein the protrusion of the one of the removing members includes a pair of protrusions projecting in directions away from each other to be axially supported by respective ones of the first support portions of the extending support portions,
wherein the protrusion of the other one of the removing members includes a pair of protrusions projecting in directions away from each other to be axially supported by respective ones of the second support portions of the extending support portions,
wherein the first support portion is in a shape of a groove or slot that is shaped to be gradually closer to the other one of the removing members as progressing toward the other end of the arm member, and
when the electrode tip is removed from the small-diameter portion, the arm member is pressed at the other end thereof in a direction of the one of the removing members with the removing members being close together and with the nails being inserted in the gap, to pivotally move the arm member about the protrusion of the other one of the removing members, and thereby the first support portion guides the protrusion of the one of the removing members to move the one of the removing members apart from the other one of the removing members, causing one of the nails to press the electrode tip in a direction away from the large diameter portion, and the other one of the nails to be pressed against the large diameter portion, to remove the electrode tip from the small-diameter portion;
an operating rod provided attached on to the other end of the arm member and configured to be held by an operator during operation;
and an impacting member attached on a side of the extending support portion opposite to the removing member.

* * * * *